United States Patent

[11] 3,601,961

[72] Inventor Ernest L. Kenton
 Kissimmee, Fla.
[21] Appl. No. 12,933
[22] Filed Feb. 20, 1970
[45] Patented Aug. 31, 1971
[73] Assignee Kid Glove Harvesters, Inc.
 Orlando, Fla.
 Continuation-in-part of application Ser. No. 794,821, Nov. 22, 1968, now Patent No. 3,521,432, dated July 21, 1970, which is a division of application Ser. No. 353,062, May 26, 1966, now Patent No. 3,412,542, dated Nov. 26, 1968.

[54] PICKING HEAD FOR FRUIT HARVESTER AND METHOD OF HARVESTING
 10 Claims, 4 Drawing Figs.
[52] U.S. Cl. .................................................. 56/328
[51] Int. Cl. .......................................... A01g 19/08
[50] Field of Search ........................................ 56/328, 332

[56] References Cited
 UNITED STATES PATENTS
 2,698,508  1/1955  Hollister ...................... 56/332
 2,968,141  1/1961  McGough ...................... 56/332
 3,143,844  8/1964  Polk, Jr. ...................... 56/328
 3,161,007  12/1964  Bergquist ...................... 56/332
 3,485,026  12/1969  Davis ........................... 56/328

Primary Examiner—Russell R. Kinsey
Attorney—Shaffert and Miller

ABSTRACT: A picking head for a fruit harvester and a method of harvesting comprises the use of a high friction endless belt and a low friction polished pipe spaced apart by less than the diameter of the fruit to be picked. The spaced apart belt and pipe are "combed" through a tree causing the tree branches to pass between the belt and the pipe. Since the separation between the belt and the pipe is less than the diameter of the fruit to be picked, the belt and the pipe exert a tensile force on the lower portion of the fruit. In addition, the high friction surface of the endless belt is continuously rotated in order to impart a twisting moment to the fruit to be picked. Thus, the fruit is subjected to a tensile force by the combing action and a twisting force by the moving belt. The combination of these two forces severs the stem thereby picking the fruit.

PATENTED AUG 31 1971 3,601,961

INVENTOR,
ERNEST L. KENTON

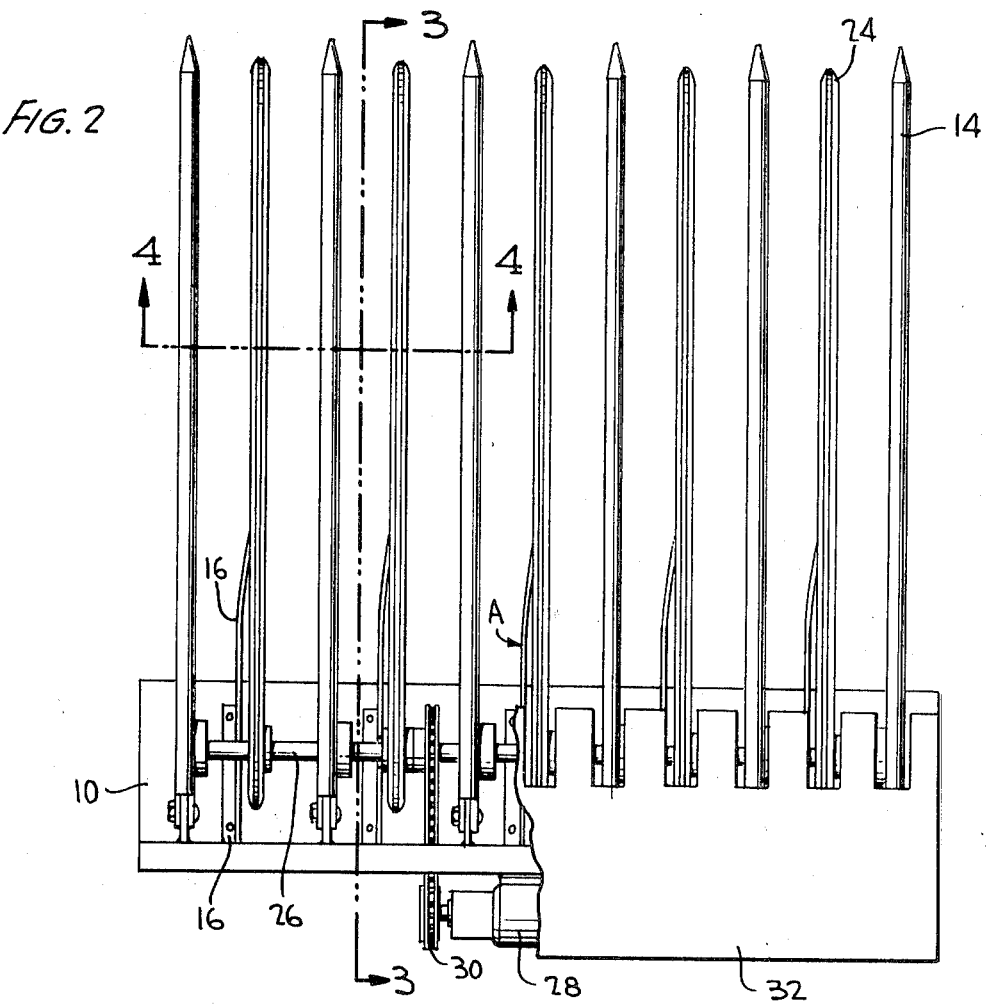
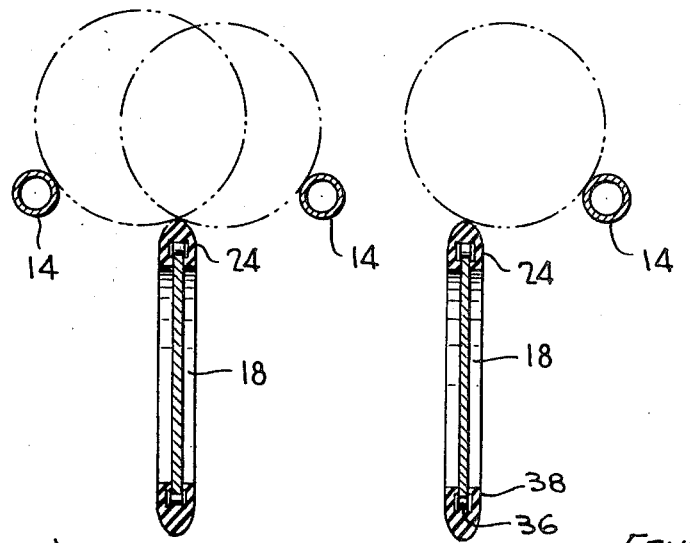

PICKING HEAD FOR FRUIT HARVESTER AND METHOD OF HARVESTING

This application is a continuation-in-part of application Ser. No. 794,821, filed Nov. 22, 1968, now U.S. Pat. 3,521,432, issued July 21, 1970, which application is a divisional of application Ser. No. 533,062, filed May 26, 1966, now U.S. Pat. 3,412,542, issued Nov. 26, 1968.

This invention relates to mechanized fruit harvesting equipment and more specifically to the picking heads for such equipment.

A number of different types of mechanical fruit pickers have recently been disclosed. These devices generally provide one or more mobile booms or arms capable of being moved among the branches of fruit trees. Associated with each such boom or arm is one or more picking heads which function to dislodge the fruit from the tree and to direct the fruit to a fruit conveying system into a fruit storage device associated with the harvester with minimum bruising and damage.

Various fruit picking devices have been suggested. Bergguist, in U.S. Pat. 3,161,007 disclosed a mechanism (FIG. 2) wherein a pair of wide resiliently surfaced belts envelope the fruit hanging from the tree and pull it from the tree branch. The considerable compressive force which must be applied to the fruit by this device can result in bruising or other damage to the product. Also, the force with which the fruit must be pulled to break the stem by purely tension can be damaging to the fruit trees. In another embodiment of the device disclosed in the Bergguist patent (FIG. 1), the fruit is rotated about an axis transverse to its stem by means of a single wide resiliently surfaced belt cooperating with an opposed, parallel smooth stationary surface that is separated from the belt by a distance equal to the diameter of the fruit to be picked. This device in effect rips the fruit from the tree, the stem again being broken by a force which is essentially tensile in nature, with no torsional component.

Polk, in U.S. Pat. 3,143,844, discloses a device in which the fruit is severed from the tree by twisting it about its stem. Thus, the embodiment depicted in FIG. 8 comprises a floor which supports the fruit to be picked and a number of spring-loaded fingers with idler rollers at their respective tips which engage the fruit and push the opposite surfaces thereof against a rotating belt which causes the fruit to rotate about its stem. Aside from the fact that the disclosed mechanism is exceedingly cumbersome, the squeezing of the fruit between the fingers and the rotating means is an essential concomitant to its operation. This fruit can be bruised if the spring tension on the fingers is too great. Also if the fingers fail to retract properly, gouging of the fruit will result.

In general, although the devices so far disclosed do serve to dislodge fruit from the trees, as yet there is none which operates with sufficient gentleness consistently to preserve the quality of the fruit while avoiding damage to the trees. Nor is any reliable enough in operation to assure that a single pass by the device over a given tree branch will remove essentially all of the ripe fruit from it.

I have discovered that two surfaces, an endless high friction belt and a polished low friction pipe, spaced apart less than the diameter of the fruit to be picked can be "combed" through a tree causing the tree branches to pass between the belt and the pipe. Since the separation between the belt and the pipe is less than the diameter of the fruit to be picked, the belt and pipe exert a tensile force on the lower portion of the fruit. In addition, the high friction surface of the endless belt is continuously rotated in order to impart a twisting moment to the fruit to be picked. Thus, the fruit is subjected to a tensile force by the combing action and a twisting force by the moving belt. The combination of these two forces serves the stem thereby picking the fruit. In this manner of severing the stem, it is not necessary to grip the fruit in such a manner as to risk bruising it.

It is therefore an object of this invention to provide a picking head for a mechanical fruit harvester and a method of harvesting which will remove ripe fruit from a tree without bruising or otherwise damaging the fruit and also without damaging the tree.

The manner in which the instant invention accomplishes these and other objectives will become apparent from this specification, especially when considered in conjunction with the accompanying drawings in which:

FIG. 2 is a top view of the picking head of FIG. 1.

FIG. 4 is a cross sectional view of the picking head of FIG. 1 taken along lines 4—4 of FIG. 2.

Figure 1:
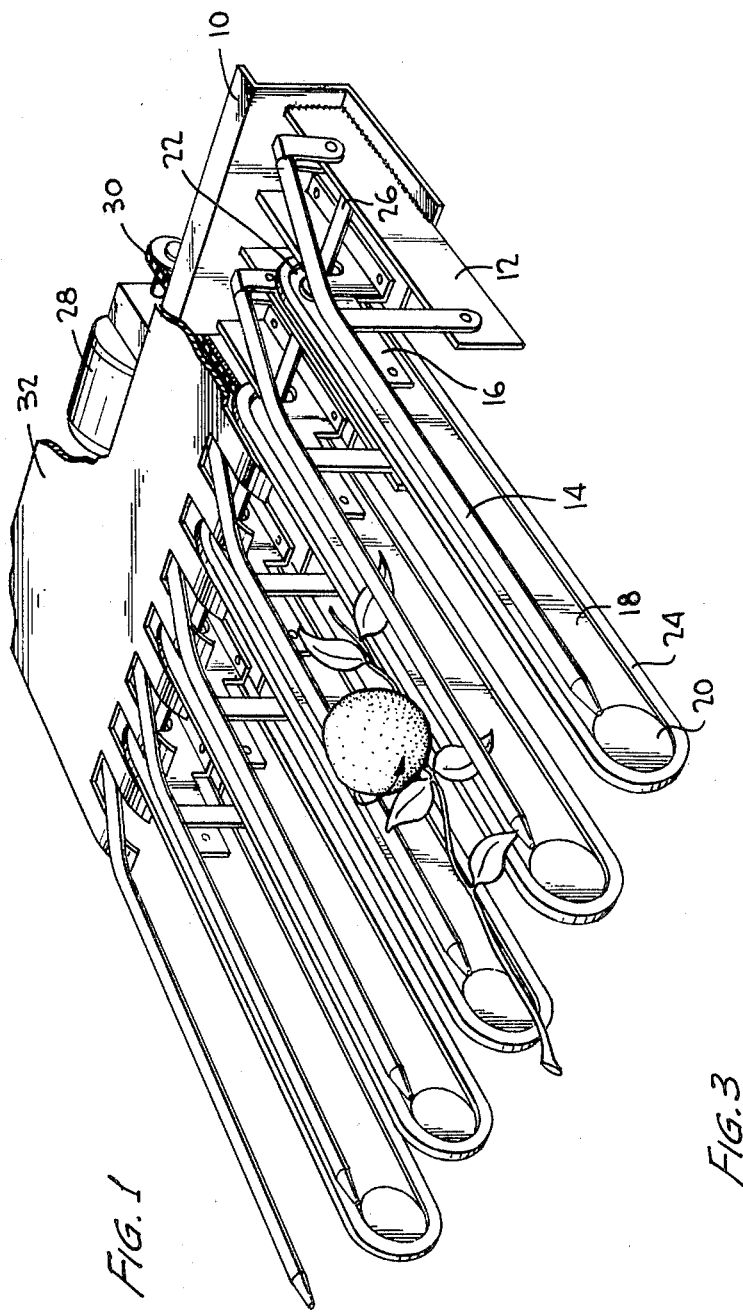
FIG. 1 is a perspective view of the picking head of the instant invention.

Referring to the drawings in particular, FIG. 1 shows a perspective view of the picking head of the instant invention. A plurality of polished pipes 14 having relatively low friction surfaces are anchored to main support 10 by pipe supports 12. Endless belts 24 having relatively high friction surfaces are supported on their interior surfaces by belt support members 18 and by pulleys 20 and drive pulleys 22. Belt support members 18 are anchored to main support 10 by supports 16.

Motor 28 is securely attached to main support 10 by means not shown. As shown best in FIG. 2, motor 28 drives endless chain 30 which in turn rotates drive shaft 26. Drive shaft 26 is connected to drive pulleys 22 and thereby simultaneously rotates the plurality of endless belts 24. Platform 32 (attached to main support 10 by means not shown) is provided to catch all picked fruit and to convey said picked fruit into a storage bag (not shown) which preferably is attached to the rear terminal portion of platform 32.

As shown in FIGS. 1 and 2, platform 32 contains a plurality of teeth at the front end thereof. These teeth enable the picked fruit to be transferred from contact with the polished pipe and the endless belt to contact with platform 32 without encountering any protruding surfaces that might damage the fruit.

Although the picking head may be manually "combed" through the trees, it is contemplated that the picking head of the instant invention will be securely attached to a mechanical device which will "comb" the picking head through the branches of a tree. As shown in fIG. 1, the picking head can become quite heavy if numerous polished pipes and endless belts are utilized and accordingly a machine assisted "combing" operation is preferred.

Referring more particularly to the mechanics of severing the fruit to be picked from its stem, reference is made to FIGS. 1 and 4. As the picking head is "combed" through the tree, the combination of the polished pipe and the endless belt engage the fruit to be picked since the polished pipe and the endless belt are separated by a distance less than the largest diameter of the fruit to be picked. This is advantageous because all mature fruit of a normal size will not be able to pass between the polished pipe and the endless belt whereas all small immature fruit not ready for picking will simply pass between the polished pipe and the endless belt.

Figure 3:
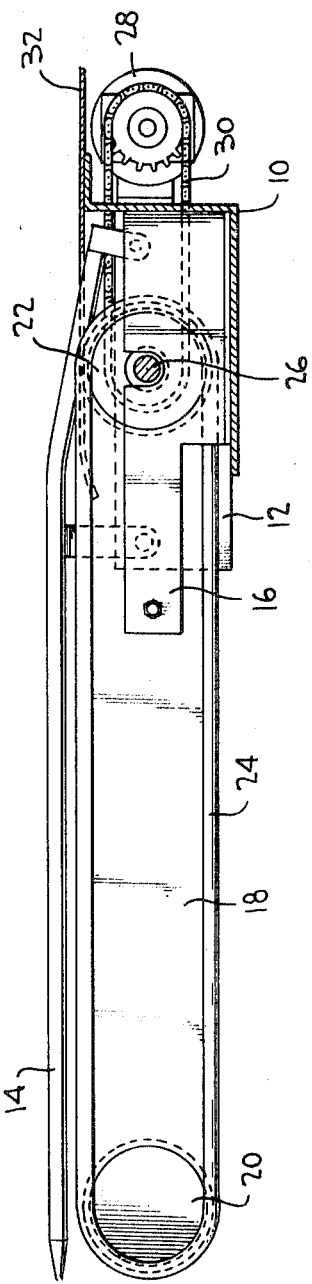
FIG. 3 is an elevation view of the picking head of FIG. 1 taken along lines 3—3 of FIG. 2.

As shown in FIGS. 3 and 4, since the polished pipe is disposed at a higher elevation than the endless belt, the fruit to be picked first makes contact with the polished pipe. The polished pipe then pitches the fruit into engagement with the high friction surface of the endless belt. In addition, since the picking head is a constantly rotated in an upward direction by the "combing" action, an additional tensile force is applied which also forces the fruit into engagement with the high friction surface of the endless belt. Thus, the elevated position of the polished pipe and the upward movement of the picking head due to the "combing" motion combine to force the fruit to be picked into tight engagement with the high friction surface of the endless belt. The continuous movement of the endless belt imparts a twisting moment to the fruit to be picked which is resisted only by the stem of the fruit. When the twisting moment exceeds the structural strength of the stem, the stem is severed. As shown in FIG. 1, the rotation of endless belts 24 is such that all picked fruit is displaced towards platform 32 and thence into a suitable storage container.

As shown best in FIGS. 2 and 3, the endmost portions of polished pipes 14 extend further than the endmost portions of endless belts 24. This enables polished pipes 14 to act as guard surfaces and to thereby protect endless belts 24 from the branches of the tree which could cause damage to the endless belts.

As is best shown in FIG. 4, each endless belt is separated from its adjacent endless the largest diameter of the fruit to be picked. Thus, since the endless belts are separated from each other by such a large distance and since the polished pipes are positioned at a higher elevation than the endless belts, the entangling branches of the tree are relatively free to move within the relatively large distance separating the endless belts. In this regard, it is noted that supports 16 for endless belts 24 and pipe supports 12 for polished pipes 14 do not extend far beyond the front terminal portion of platform 32. Thus, there is very little hardware in the front of the picking head which could become entangled with the branches carrying the fruit to be picked. In this regard, it is noted that the connection between pulleys 20 and endless belts 24 is of a tongue and groove nature and therefore does not produce any projections which could become entangled with the branches.

As shown in FIG. 4, endless belt 24 is comprised of a chain 36 having a rubber covered portion 38. However, endless belt 24 may be comprised of any flexible high friction surface.

As is evident from the above set forth description, the present invention may be embodied in other specific forms without departing from the spirit or essential attributes thereof. Accordingly, reference should be made to the appended claims, rather than to the foregoing specification as indicating the scope of the invention.

I claim:

1. A picking head for a fruit harvester comprising a fixed elongated first member having a first surface comprised of a relatively low friction material, a second member having a second surface comprised of a relatively high friction material, means rigidly supporting said first member to one side of said second member at a distance less than the largest diameter of the fruit to be picked in order to vertically support the fruit on said first and second members, and means to move said second member with respect to said first member such that upon contact of the tree supported fruit with said first and said second members the fruit is rotated to sever its stem to thereby separate the fruit from the tree.

2. A picking head as set forth in claim 1 wherein said first member is substantially parallel to said second member.

3. A picking head as set forth in claim 2 wherein said second member is an endless belt.

4. A picking head as set forth in claim 3 wherein said first member contacts the fruit to be picked at a point higher in elevation than the point at which the second member contacts the fruit to be picked.

5. A picking head as set forth in claim 4 wherein said picking head has a front end which first engages the fruit to be picked and a back end to which the fruit once picked is conveyed and wherein said endless belt is rotated in a predetermined direction to convey the picked fruit towards said back end of said picking head.

6. A picking head as set forth in claim 5 wherein said first member extends to said front end of said picking head and wherein said second member terminates short of said front end of said picking head.

7. A picking head as set forth in claim 6 further including at least two additional fixed elongated first members, said first members being equally spaced, at least one additional second member, each of said second members being centrally disposed between two of said first members, and means to simultaneously move both of said second members with respect to said fixed first members.

8. A picking head as set forth in claim 7 wherein the distance between said second members is greater than the largest diameter of the fruit to be picked.

9. A picking head as set forth in claim 8 wherein said endless belt is a rubber covered chain and wherein said first member is a polished pipe.

10. A picking head as set forth in claim 1 wherein said first member is a polished pipe.

UNITED STATES PATENT OFFICE
CERTIFICATE OF CORRECTION

Patent No. 3,601,961                Dated August 31, 1971

Inventor(s)  Ernest L. Kenton

It is certified that error appears in the above-identified patent and that said Letters Patent are hereby corrected as shown below:

Column 1, line 8 - Ser. No. 533,062 should be -- Ser. No. 553,062 --.

Column 1, lines 22 and 31 - Bergguist should be -- Bergquist --.

Column 1, line 72 - serves should be -- severs --.

Column 3, line 13 - after "endless" insert -- belt by a distance greater than --.

Signed and sealed this 21st day of March 1972.

(SEAL)
Attest:

EDWARD M. FLETCHER, JR.
Attesting Officer

ROBERT GOTTSCHALK
Commissioner of Patents